Patented Aug. 14, 1945

2,382,071

UNITED STATES PATENT OFFICE 2,382,071

METHOD OF PREPARING GAMMA-ACETOPROPANOL

Lucas P. Kyrides, Webster Groves, and Ferdinand B. Zienty, St. Louis, Mo., assignors to Monsanto Chemical Company, St. Louis, Mo., a corporation of Delaware No Drawing. Application September 8, 1944, Serial No. 553,290

20 Claims. (Cl. 260—594)

This invention relates to the preparation of keto alcohols and lactones and particularly to a method of preparing gamma-acetopropanol and gamma-valerolactone from 1,4-pentanediol.

The dehydrogenation of glycerol by heat treatment in the presence of copper chromite as a catalyst results in the formation of hydroxy-propanone (acetol). Likewise, the dehydrogenation of 1,3-butylene glycol by heat treatment in the presence of basic copper carbonate results in the formation of acetoethanol. Consequently, the dehydrogenation of 1,4-pentanediol by heat treatment in the presence of copper chromite would be expected by analogy to form gamma-acetopropanol. We have discovered, however, that this process results in the formation of gamma-valerolactone with only traces of gamma-acetopropanol. Moreover, various promoters of the alkaline type, such as sodium hydroxide and sodium carbonate, and other promoters, such as decolorizing charcoal and alundum, merely serve to increase the yield of gamma-valerolactone.

The object of the present invention is to provide a novel process for the preparation of gamma-acetopropanol and gamma-valerolactone from 1,4-pentanediol.

Other objects will become apparent from the following specification and examples.

The method of the present invention, generally stated, comprises mixing 1,4-pentanediol with small quantities, for example, 0.001 to 0.1 mole percent, based on the pentanediol, of an organic acid, such as lauric, sebacic, stearic, caproic, 2-ethyl hexoic, phenyl acetic and acetic acids, and heating the mixture for a short period of time, for example from 5 to 15 minutes, at a temperature below 100° C. and preferably under reduced pressure. The mixture is then cooled, for example to approximately 50° C., and a copper chromite catalyst is added. The reaction mixture is then heated to initiate and maintain the dehydrogenation reaction, and the crude reaction products are simultaneously distilled from the reaction mixture. The distilled reaction products are then slowly redistilled, in such a manner that the temperature of the condensing vapors does not exceed 100 to 105° C. The distillate consists of two layers which are identified as a lower water layer and an upper layer of 2-methyl-4,5-dihydrofuran. The two layers are allowed to stand together at room temperature with occasional agitation until a homogeneous solution is obtained. By the addition of a small quantity of an acid, for example, approximately 1 cc. of 1/50 normal hydrochloric, sulfuric or acetic acid, to the receiver prior to or during the slow distillation, the recombination of the water with the 2-methyl-4,5-dihydrofuran to form gamma-acetopropanol takes place substantially as soon as the two components are distilled into the receiver. It is desirable to add the acid before a large volume of distillate is formed, since otherwise the recombination may be accompanied by violence. The resulting solution is then distilled under reduced pressure. The distillate is gamma-acetopropanol. The high boiling residue from the redistillation of the distilled reaction products is subsequently distilled to recover gamma-valerolactone. The remaining residue may be further distilled to recover residual unreacted 1,4-pentanediol.

The operation of adding the small portion of acid to the 1,4-pentanediol and short heat treatment prior to the addition of the catalyst have been found to be desirable in the production of consistently satisfactory yields of gamma-acetopropanol from 1,4-pentanediol. The alternatives, namely the addition of the catalyst before the addition of the acid, or simultaneously therewith have been found to result frequently in somewhat decreased yields of gamma-acetopropanol, and in some instances only traces of gamma-acetopropanol are formed by these alternative procedures. The short pre-heat treatment also has the effect of removing air from the reaction mixture and thereby stabilizing the uniformity of contact of the catalyst. The yield of the desired product has been found to be more nearly uniform with this practice.

In the preparation of gamma-acetopropanol by the method of the present invention, the still in which the dehydrogenation is conducted may be re-charged as many as five times or more after each previous yield of gamma-acetopropanol and gamma-valerolactone is distilled over. In this manner, the catalyst may be used repeatedly without the necessity of starting with a fresh batch of catalyst. The catalyst may generally be employed for successive batches in this manner until the yield of gamma-acetopropanol on successive operations decreases to an uneconomical level.

In the slow redistillation of the crude mixture recovered from the catalytic reaction, the preferred practice is to maintain the temperature of the condensing vapors below 110° C. In this manner, the condensing vapors will be substantially free from gamma-valerolactone which distills over at higher temperatures. As an alternative, however, the temperature may be as high as 150° C., or even 205° C., or just below the vapor temperature of boiling gamma-valerolactone, in which instance a more rapid distillation is effected. Under such conditions, a substantial quantity of gamma-valerolactone will be distilled over and the distillate will be a mixture of gamma-valerolactone and gamma-acetopropanol. Moreover, the gamma-acetopropanol will be distilled over without first decomposing into water and 2-methyl-4,5-dihydrofuran. The slow distillation is therefore preferred.

The copper chromite catalyst used in the process of the present invention may be prepared in the usual manner for a catalyst of this type for hydrogenation and dehydrogenation purposes. A suitable method has been found to be that described by Calingaert and Edgar in the Journal of Industrial and Engineering Chemistry, Vol. 26, pages 878-9, 1934. Briefly, this process comprises dissolving 250 g. moles of copper sulfate pentahydrate and 125 g. moles of sodium dichromate dihydrate in 300 l. of water, slowly adding 28% ammonia until no further precipitation occurs in the mother liquor, filtering the resulting slurry, washing the filter cake with water until free from water-soluble salts, air drying the cake and oven drying at 110° C. The dried cake is broken up into friable lumps and mixed with sufficient water to form a coherent mass when squeezed in the hand. The mass is then passed through a 12-mesh screen to form granules which are then roasted at 320 to 340° C. until the material is lustrous black in color and appearance, with a faint brownish cast. The material is then pulverized and screened through a 200-mesh screen. The resulting material may then be used as the catalyst in the aforedescribed process. Other methods of preparing the copper chromite catalyst may be employed, the criterion being the preparation of a catalyst having a suitable degree of activity for dehydrogenation reactions.

The following examples will serve to illustrate the process of the present invention. These examples are merely illustrative and are not to be construed as limiting the scope of the invention.

*Example I*

A mixture of 52 g. of 1,4-pentanediol and 0.5 g. of stearic acid was placed in a flask equipped with a stirrer, a thermometer and a condenser for downward distillation, connected to a receiver. The mixture was stirred and the system was placed under an absolute pressure of 25 mm. The mixture was heated to 90° C. and the resulting solution was cooled under reduced pressure. The system was vented and 3.0 g. of copper chromite were added. Then the distillation receiver was connected to a bubble-counter and the mixture was heated. At about 200° C. a vigorous evolution of hydrogen occurred, and the temperature of the reaction mixture dropped to about 190° C. The reaction products were slowly distilled over, and the heating was interrupted when only a small amount of material remained in the reaction flask. The residue remaining in the flask was allowed to cool below 50° C. Then another charge of 52 g. of 1,4-pentanediol was introduced into the flask, and the process was continued as before. After two cycles as outlined hereinbefore had been completed, the distillate was transferred to a still. The products which constitute the distillate from the reaction flask were then distilled, the temperature of the still being allowed to rise gradually to 205° C. while the column head temperature was maintained below 110° C. The resulting distillate consisted of two layers, a lower water layer and an upper layer of 2-methyl-4,5-dihydrofuran. The product was permitted to remain at room temperature with occasional shaking until a homogeneous solution was obtained (about 36 to 48 hours). Then the product was placed in a still and distilled under reduced pressure. Yield, 27% of gamma-acetopropanol, calculated on the 1,4-pentanediol consumed. Boiling point, 85 to 86° C./10 mm.

The high boiling residue remaining after the distillation of gamma-acetopropanol from the mixture of reaction products was distilled under reduced pressure, yielding 44 g. of gamma-valerolactone, boiling point, 84 to 88° C./13.5 mm., and 5.6 g. of unreacted 1,4-pentanediol, boiling point, 120 to 121° C./14 mm.

*Example II*

A mixture of 52 g. of 1,4-pentanediol and 0.35 g. of phenyl acetic acid was heated at 90° C. for a few minutes under reduced pressure. The mixture was allowed to cool to 50° C., the containing vessel was vented to atmospheric pressure, and 3.0 g. of copper catalyst was added. The reaction mixture was then heated at about 195° C., and the dehydrogenation products were distilled out slowly. When only a small amount of material was left in the flask, the heating was interrupted and the flask with its contents was permitted to cool below 50° C. An additional quantity of 52 g. of 1,4-pentanediol was added to the reaction vessel, and the heating was repeated as before. The crude product distillate was placed in a still, and the gamma-acetopropanol component was distilled out at atmospheric pressure to a final still temperature of 205° C. The distillate was present in the form of two layers, an aqueous layer and a layer of 2-methyl-4,5-dihydrofuran. After about 36 hours the two layers had coalesced and vacuum distillation produced a yield of 22.8% of gamma-acetopropanol, calculated on the 1,4-pentanediol consumed. The residue from the distillation of the crude distillate from which the gamma-acetopropanol component was removed was further distilled under reduced pressure to yield 16 g. of gamma-valerolactone and 48 g. of 1,4-pentanediol

*Example III*

Gamma-acetopropanol and gamma-valerolactone were prepared according to the method of Example I, using lauric, sebacic, caproic, 2-ethyl hexoic and acetic acids in place of stearic acid. The results are tabulated in the following table, together with the results of Examples I and II and a control in which the copper chromite catalyst was employed in the absence of an organic acid.

| Charge of 1,4-pentanediol, g. | Copper chromite catalyst | Organic acid | Weight of acid | Pure γ-acetopropanol | Yield of γ-acetopropanol | γ-valerolactone |
|---|---|---|---|---|---|---|
| | Grams | | Grams | Grams | Percent | Grams |
| 52 × 1 | 3.0 | Control | | 19.6 | 21.7 | 41 |
| 52 × 2 | 3.0 | Lauric | 0.5 | 21.2 | 26.7 | 29.5 |
| 52 × 2 | 3.0 | Sebacic | 0.25 | 26.0 | 27.0 | 30 |
| 52 × 2 | 3.0 | Stearic | 0.5 | 20.8 | 25.2 | 44 |
| 52 × 2 | 3.0 | Caproic | 0.3 | 10.0 | 11.6 | 25 |
| 52 × 2 | 3.0 | 2-ethyl hexoic | 0.5 | 12.5 | 22.8 | 51 |
| 52 × 2 | 3.0 | Phenyl acetic | 0.35 | 20.9 | 23.2 | 16 |
| 52 × 2 | 3.0 | Acetic | 0.15 | | | 63 |
| 52 × 1 | 3.0 | Sulfuric | 0.15 | | | 0 |

The yield of gamma-acetopropanol in the foregoing table is based on the 1,4-pentanediol consumed. It will be observed from the table that the use of a mineral acid such as sulfuric acid in the process in place of an organic acid failed to produce any of the desired gamma-acetopropanol, or even gamma-valerolactone. Other organic acids in addition to those listed in the foregoing table have been found suitable for the process of the present invention. The quantity of organic acid used in the process of this invention may be varied over a relatively wide range, for example from 0.001 or even less to 0.1 mole percent or more. Ultimately a point may be reached at which further increases of acid will tend to interfere with the operation of the catalyst. Suitable acids for the purpose of the present invention may be selected from the class of monocarboxylic acids and polycarboxylic acids, including aliphatic acids such as butyric, succinic, citric and tricarballylic acids and aromatic acids such as phthalic, terephthalic, isophthalic and naphthoic acids and phthalic anhydride.

*Example IV*

The method of Example II was repeated with the following alteration in the procedure. At the point in the process at which the crude reaction mixture distilled from the catalyst was redistilled slowly at a temperature below 110° C., the distillate was collected in a receiver containing 1 cc. of 1/50 normal hydrochloric acid. During the collection of the distillate, the contents of the receiver were agitated occasionally. In each instance after agitation of the receiver, a homogeneous solution appeared to be formed in the receiver, indicating the rapid reaction of 2-methyl-4,5-dihydrofuran and water to reform gamma-acetopropanol in the presence of the small portion of acid. This operation thereby eliminated the necessity for a 36-hour standover, as practiced in the preceding run.

We claim:

1. The method of preparing gamma-acetopropanol and gamma-valerolactone comprising heating 1,4-pentanediol with a small portion of an organic acid for a short period of time, cooling the mixture, heating the cooled mixture with a copper chromite catalyst, simultaneously recovering a crude mixture of reaction products from the reaction mixture, subsequently recovering a mixture of 2-methyl-4,5-dihydrofuran and water from said reaction products, allowing said mixture to stand until gamma-acetopropanol is formed in said mixture, recovering gamma-acetopropanol from said mixture, and subsequently recovering gamma-valerolactone from the residue of said crude mixture of reaction products.

2. The method of preparing gamma-acetopropanol and gamma-valerolactone comprising heating 1,4-pentanediol with a small portion of an organic acid for a short period of time, cooling the mixture, heating the cooled mixture with a copper chromite catalyst, simultaneously distilling off a crude mixture of reaction products from the reaction mixture, subsequently redistilling said crude mixture with a vapor temperature below 110° C. to recover a mixture of 2-methyl-4,5-dihydrofuran and water, allowing said mixture to stand until a homogeneous solution is formed, distilling said mixture under reduced pressure to recover gamma-acetopropanol, and subsequently recovering gamma-valerolactone from the residue remaining after the redistillation of the crude mixture.

3. The method of preparing gamma-acetopropanol comprising heating 1,4-pentanediol with a small portion of an organic acid for a short period of time, cooling the mixture, heating the cooled mixture with a copper chromite catalyst, simultaneously distilling off a crude mixture of reaction products from the reaction mixture, subsequently redistilling said crude mixture with a vapor temperature below 110° C., allowing the resulting distillate to stand until a homogeneous solution is formed and recovering gamma-acetopropanol from said solution.

4. The method of preparing gamma-acetopropanol comprising heating 1,4-pentanediol with a small portion of an organic acid for a short period of time, cooling the mixture, heating the cooled mixture with a copper chromite catalyst, simultaneously distilling off a crude mixture of reaction products from the reaction mixture, subsequently redistilling said crude mixture with a vapor temperature below 110° C., allowing the resulting distillate to stand until a homogeneous solution is formed, and distilling gamma-acetopropanol from said solution under reduced pressure.

5. The method of preparing gamma-acetopropanol comprising heating 1,4-pentanediol with a small portion of an organic acid and a copper chromite catalyst, distilling off a crude mixture of reaction products from the reaction mixture, subsequently redistilling said crude mixture with a vapor temperature below 110° C., collecting the distillate in the presence of a small portion of an acid, and distilling gamma-acetopropanol from said distillate under reduced pressure.

6. In the method of preparing gamma-acetopropanol from 1,4-pentanediol, the steps comprising heating 1,4-pentanediol with a small portion of an organic acid, cooling the resulting mixture, and heating the cooled mixture with a copper chromite catalyst.

7. The method of claim 6 in which the organic acid is stearic acid.

8. The method of claim 6 in which the organic acid is acetic acid.

9. The method of claim 6 in which the quantity of organic acid is 0.001 to 0.1 mole percent.

10. The method of claim 6 in which the quantity of organic acid is 0.005 to 0.01 mole percent.

11. The method of preparing gamma-acetopropanol and gamma-valerolactone comprising heating a mixture of 1,4-pentanediol, a small portion of an organic acid and a copper chromite catalyst, distilling off a crude mixture of reaction products from the reaction mixture, subsequently redistilling said crude mixture with a vapor temperature below the vapor temperature of boiling gamma-valerolactone, collecting the distillate, allowing the mixture to stand until a homogeneous solution is formed, recovering gamma-acetopropanol from said mixture, and subsequently recovering gamma-valerolactone from the residue remaining after the redistillation of the crude mixture.

12. The method of preparing gamma-acetopropanol and gamma-valerolactone comprising heating a mixture of 1,4-pentanediol, a small portion of an organic acid and a copper chromite catalyst, distilling off a crude mixture of reaction products from the reaction mixture, subsequently redistilling said crude mixture with a vapor temperature below 110° C., collecting the distillate in the presence of a small portion of an acid, redistilling said distillate under reduced pressure to recover gamma-acetopropanol, and subsequently recovering gamma-valerolactone from the residue remaining after the redistillation of the crude mixture.

13. The method of preparing gamma-acetopropanol and gamma-valerolactone comprising heating a mixture of 1,4-pentanediol, a small portion of an organic acid and a copper chromite catalyst, distilling off a crude mixture of reaction products from the reaction mixture, subsequently redistilling said crude mixture with a vapor temperature below 110° C., collecting the distillate mixture, adding a small portion of an acid to said distillate mixture, allowing the mixture to stand until a homogeneous solution is formed, distilling said mixture under reduced pressure to recover gamma-acetopropanol and subsequently recovering gamma-valerolactone from the residue remaining after the redistillation of the crude mixture.

14. In the method of preparing gamma-acetopropanol from 1,4-pentanediol, the steps comprising heating a mixture of 1,4-pentanediol, a small portion of an organic acid and a copper chromite catalyst, distilling off a crude mixture of reaction products and subsequently recovering gamma-acetopropanol from said crude mixture.

15. The method of claim 14 in which the organic acid is stearic acid.

16. The method of claim 14 in which the organic acid is acetic acid.

17. The method of claim 14 in which the quantity of organic acid is 0.001 to 0.1 mole percent.

18. The method of claim 14 in which the quantity of organic acid is 0.005 to 0.01 mole percent.

19. The method of preparing gamma-acetopropanol and gamma-valerolactone comprising heating a mixture of 1,4-pentanediol with a small portion of an organic acid and a copper chromite catalyst, recovering a crude mixture of reaction products from the reaction mixture, subsequently recovering a mixture of 2-methyl-4,5-dihydrofuran and water from said reaction products, allowing said mixture to stand until gamma-acetopropanol is formed in said mixture, recovering gamma-acetopropanol from said mixture, and subsequently recovering gamma-valerolactone from the residue of said crude mixture of reaction products, substantially as described in the specification and examples.

20. In the method of preparing a mixture of gamma-acetopropanol and gamma-valerolactone from 1,4-pentanediol, the steps comprising heating a mixture of 1,4-pentanediol, a small portion of an organic acid and a copper chromite catalyst and recovering a mixture of gamma-acetopropanol and gamma-valerolactone from the reaction mixture.

LUCAS P. KYRIDES.
FERDINAND B. ZIENTY.